(12) United States Patent
Wise et al.

(10) Patent No.: US 7,406,845 B2
(45) Date of Patent: Aug. 5, 2008

(54) STEERING COLUMN LOCK ASSEMBLY AND METHOD OF OPERATING THE SAME

(75) Inventors: Melonee Wise, Champaign, IL (US); Richard D Zielesch, Jr., Port Richey, FL (US); Richard Stuedemann, Ortonville, MI (US); Michael Laraia, Washington, MI (US); Timothy Gasparski, Shelby Township, MI (US); William J Elliott, Commerce, MI (US); Mark O Minty, Shelby Township, MI (US); Travis D Bechtel, Goodrich, MI (US)

(73) Assignee: Chrysler LLC, Auburn Hills, MI (US)

( * ) Notice: Subject to any disclaimer, the term of this patent is extended or adjusted under 35 U.S.C. 154(b) by 224 days.

(21) Appl. No.: 11/167,874

(22) Filed: Jun. 27, 2005

(65) Prior Publication Data

US 2006/0288746 A1    Dec. 28, 2006

(51) Int. Cl.
*B60R 25/02* (2006.01)
(52) U.S. Cl. .......................................... 70/186; 70/252
(58) Field of Classification Search ........... 70/182–186, 70/252
See application file for complete search history.

(56) References Cited

U.S. PATENT DOCUMENTS

| 137,400 | A | * | 4/1873 | Ahrend | 70/210 |
| 548,888 | A | * | 10/1895 | Noteman | 70/186 |
| 593,755 | A | * | 11/1897 | Pond et al. | 70/185 |
| 1,459,584 | A | * | 6/1923 | Ericsson | 70/233 |
| 1,498,940 | A | * | 6/1924 | Wheeler | 70/185 |
| 2,874,562 | A | * | 2/1959 | Cross | 70/252 |
| 3,659,443 | A | * | 5/1972 | Ball | 70/186 |
| 4,576,024 | A | * | 3/1986 | Weber | 70/252 |
| 5,226,303 | A | * | 7/1993 | Dieden et al. | 70/247 |
| 5,906,120 | A | * | 5/1999 | Thacker et al. | 70/186 |
| 2004/0069027 | A1 | * | 4/2004 | Fukushima | 70/186 |

* cited by examiner

*Primary Examiner*—Suzanne D Barrett
(74) *Attorney, Agent, or Firm*—Ralph E. Smith

(57) ABSTRACT

A steering column lock assembly and a method of operating the same, the steering column lock assembly including a steering column having a gear portion and a rotatable shaft; an actuator operably attached to the steering column, the actuator being free to translate with respect to the steering column; and a lever arm operably attached to the steering column; wherein translation of the actuator engages the lever arm with the gear portion to lock the steering column.

16 Claims, 5 Drawing Sheets

STEERING COLUMN LOCK ASSEMBLY AND METHOD OF OPERATING THE SAME

TECHNICAL FIELD OF THE INVENTION

The present invention relates generally to steering columns. More particularly, the invention relates to a steering column lock assembly and a method of operating the same.

BACKGROUND OF THE INVENTION

A vehicle may be steered by rotating a steering component, such as a steering wheel, positioned adjacent to a driver. The steering component may be operably attached at an upper end portion of a steering column so as to be rotatable about an axis. Rotation of the steering component is coupled to the turning of the vehicle's tires (the front tires and, optionally, the rear tires).

Numerous devices and methods exist for locking the vehicle steering column shaft from movement. Frequently, such devices and methods prevent the steering column shaft from being rotated to steer the vehicle. The vehicle can be a car, van, truck, motorcycle, bus, or all-terrain vehicle having a number of wheels, a boat with one or more rudders, a snowmobile with skis, a vehicle having one or more tracks, and the like. A steering column lock used in any such vehicle is typically employed to prevent vehicle theft or unauthorized use.

A common and well-known mechanism for locking a steering column includes a lock bolt that is spring-loaded into direct or indirect releasable engagement with the steering column shaft. Such engagement can be by removable insertion of the lock bolt into a groove, a notch, teeth, or an aperture in the steering column or in a gear, plate, or other element connected to the steering column. A mechanism is normally provided for retracting the lock bolt against the spring-loaded force to unlock the steering column for vehicle operation. As is well known to those skilled in the art, the mechanism can retract the lock bolt in response to user insertion and turning of a key or in response to one or more signals from a control system coupled to an actuator driving the mechanism.

Another approach includes a steering column lock that is not mechanically connected to an ignition lock cylinder for actuation. With the introduction in recent years of vehicle security systems in which a steering column lock is locked and unlocked automatically by an electronic controller connected to one or more steering column lock actuators, there is little need to locate a vehicle's ignition control (e.g., switch, button, and the like) adjacent to the steering column lock. The ignition control can be connected directly or indirectly to the steering column lock by wiring alone, and therefore can be located almost anywhere in the vehicle. Such designs may include an identification code embedded within the key that is cross-checked with an identification code in the controller. When the controller determines that the identification code is proper, the steering column is automatically unlocked thereby allowing steering.

Some concerns with the aforementioned steering column lock designs are lock complexity and lock manufacturability. Conventional mechanical steering column locks are typically assembled from a relatively large number of parts connected and fastened together in a time-consuming and expensive assembly process. The use of a large number of parts may increase the packaging size of the steering column and may increase the potential for lock assembly errors, operational problems, and malfunctions. The more modern automatic design locks, although typically smaller in packaging size, may be relatively expensive due to the need for the controller and other automatic parts. In addition, the remote positioning and other factors may reduce the reliability of such locks.

In light of the problems and limitations of existing designs, a need exists for a steering column lock that is relatively simple, is relatively easy and inexpensive to manufacture and assemble, has a relatively small packaging size, and reliably locks the steering column. Therefore, it would be desirable to provide a steering column lock assembly and method of operating the same that overcomes the aforementioned and other disadvantages.

SUMMARY OF THE INVENTION

One aspect of the present invention provides a steering column lock assembly including a steering column having a gear portion and a rotatable shaft; an actuator operably attached to the steering column, the actuator being free to translate with respect to the steering column; and a lever arm operably attached to the steering column; wherein translation of the actuator engages the lever arm with the gear portion to lock the steering column.

Another aspect of the invention provides a method of operating a steering column lock assembly including providing a steering column including a gear portion and a rotatable shaft; providing an actuator and a lever arm operably attached to the steering column; translating the actuator with respect to the steering column; engaging the gear portion with the lever arm as a result of the translating; and locking the steering column as a result of the engaging.

Another aspect of the invention provides a steering column lock assembly a steering column including a gear portion and a rotatable shaft; an actuator and a lever arm operably attached to the steering column: means for supporting the actuator and the lever arm to the steering column; means for translating the actuator with respect to the steering column; means for engaging the gear portion with the lever arm as a result of a rotation of the shaft and the translation of the actuator; and means for locking the steering column as a result of the engagement of the gear portion with the lever arm.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE PRESENTLY PREFERRED EMBODIMENTS

Figure 1:
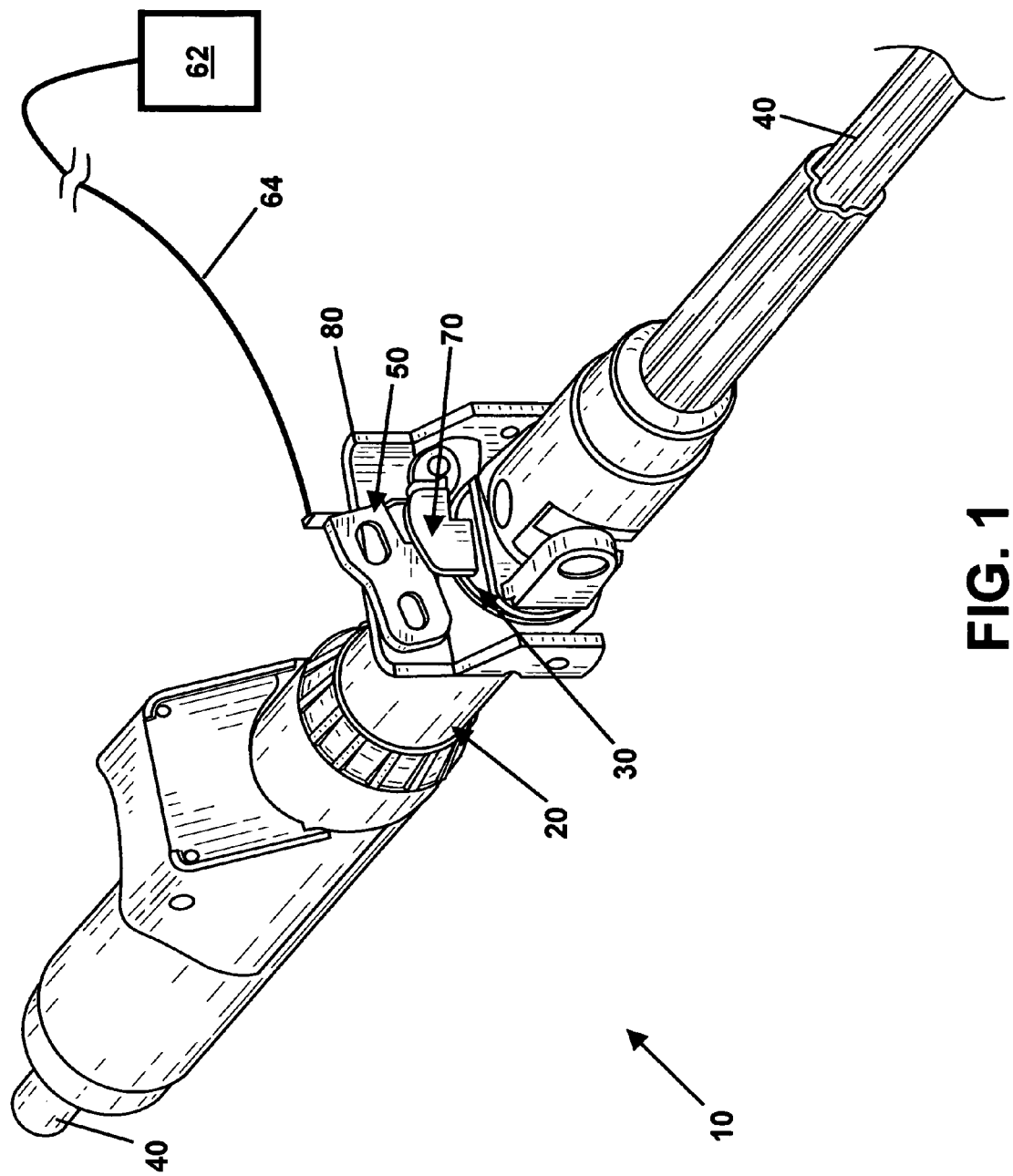
FIGS. 1 and 2 are perspective views of a steering assembly in accordance with one embodiment of the present invention.
Figure 2:
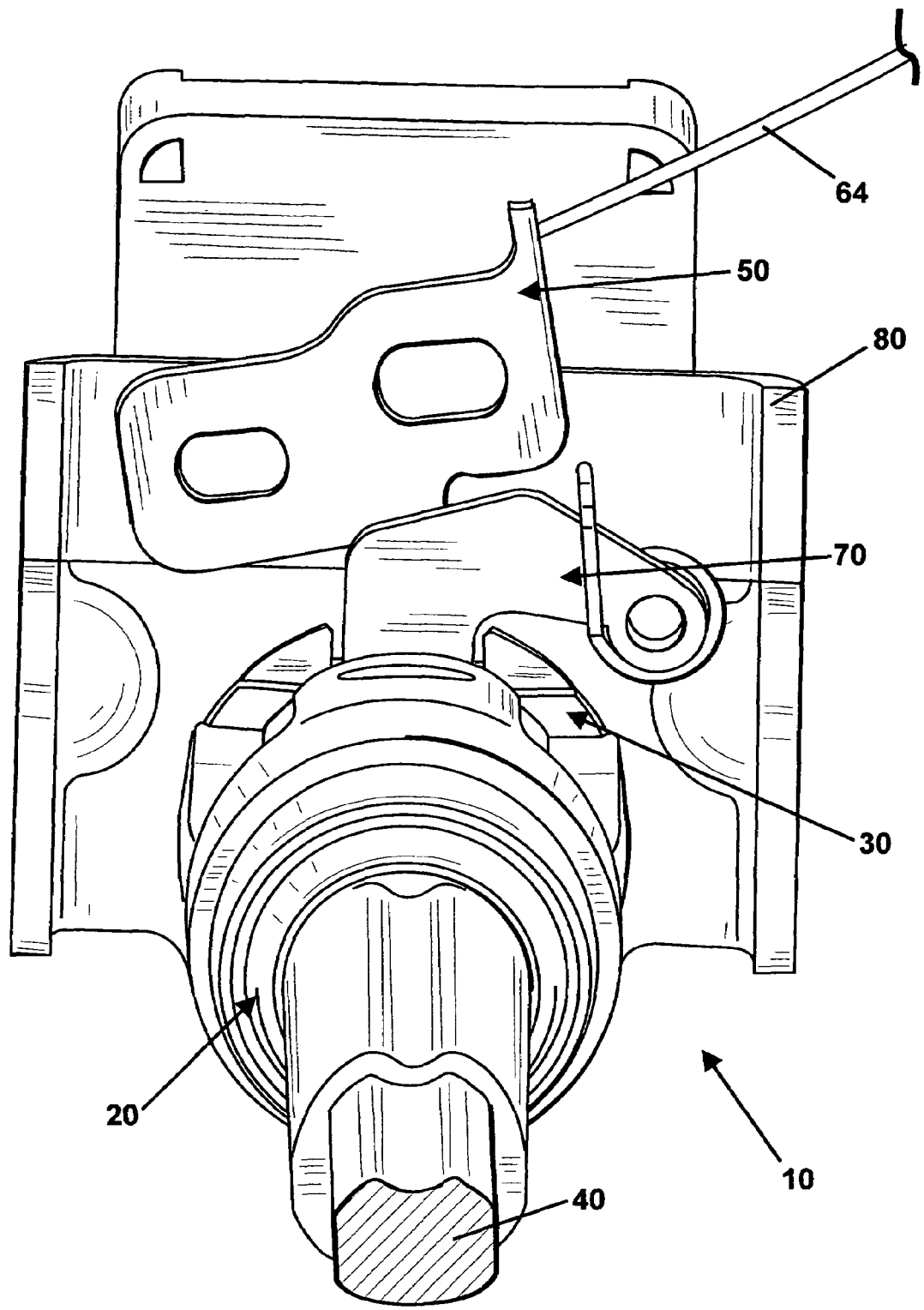

Referring to the drawings, wherein like reference numerals refer to like elements, FIGS. 1 and 2 are schematic views of a steering assembly, shown generally by numeral 10, in accordance with one embodiment of the present invention. Assembly 10 comprises a steering column 20 including a gear portion 30 and a rotatable shaft 40. An actuator 50 is operably attached to the steering column 20. The actuator 50 translates with respect to the steering column 20. A lever arm 70 is operably attached to the steering column 20. Rotation of the shaft 40 and the translation of the actuator 50 results in engagement of the lever arm 70 with the gear portion 30, locking the steering column 20. Those skilled in the art will recognize that the configuration of the assembly 10 may vary from the present description and figures. Those skilled in the art will appreciate that various mechanisms can be used in assembly 10 to engage the lever arm 70 with the gear portion 30 to lock the steering column 20, the particular mechanism being selected for the particular application.

Figure 3:
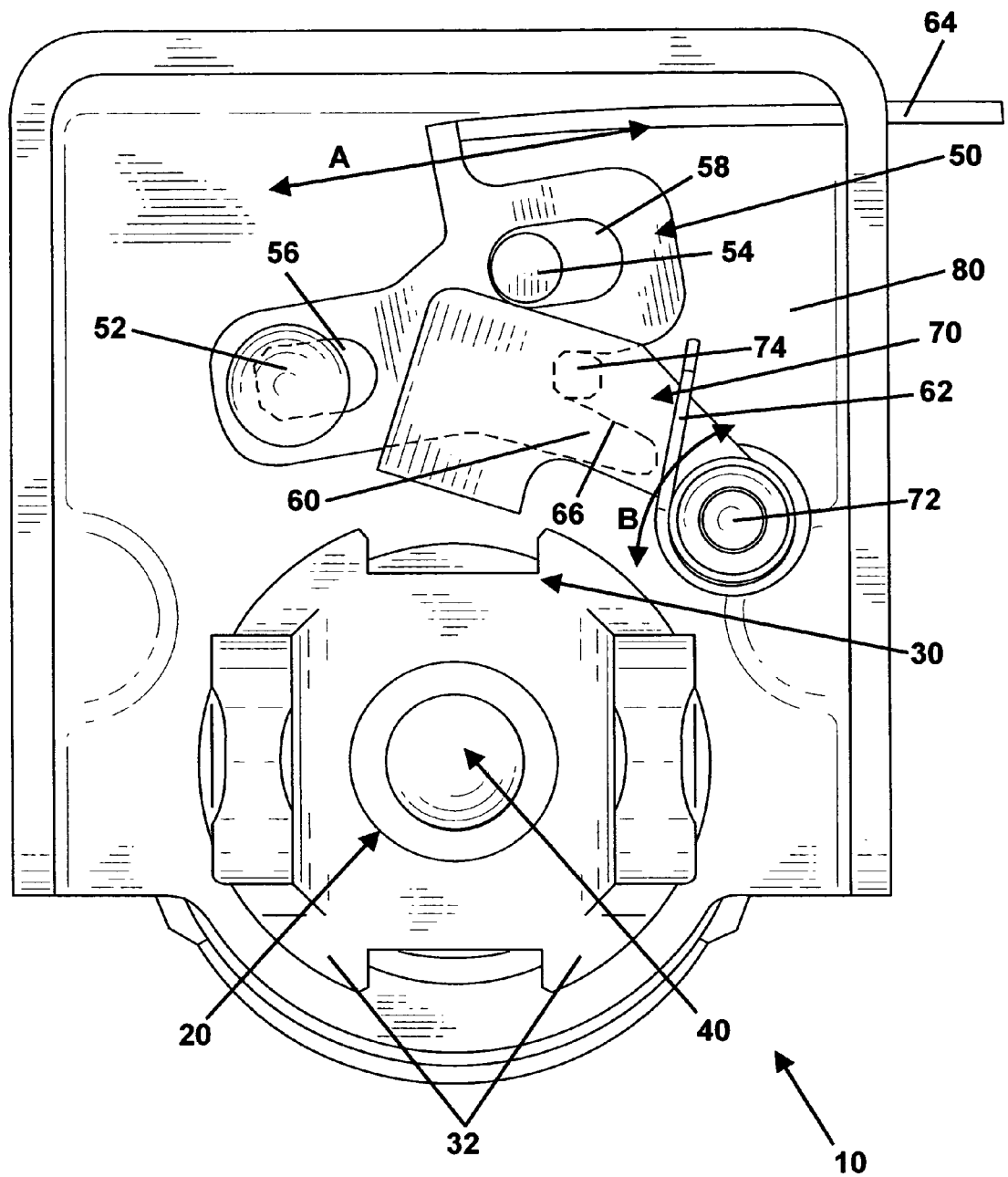
FIGS. 3 and 4 are schematic views of the steering assembly shown in FIG. 1 in the unlocked and locked positions, respectively.
Figure 4:
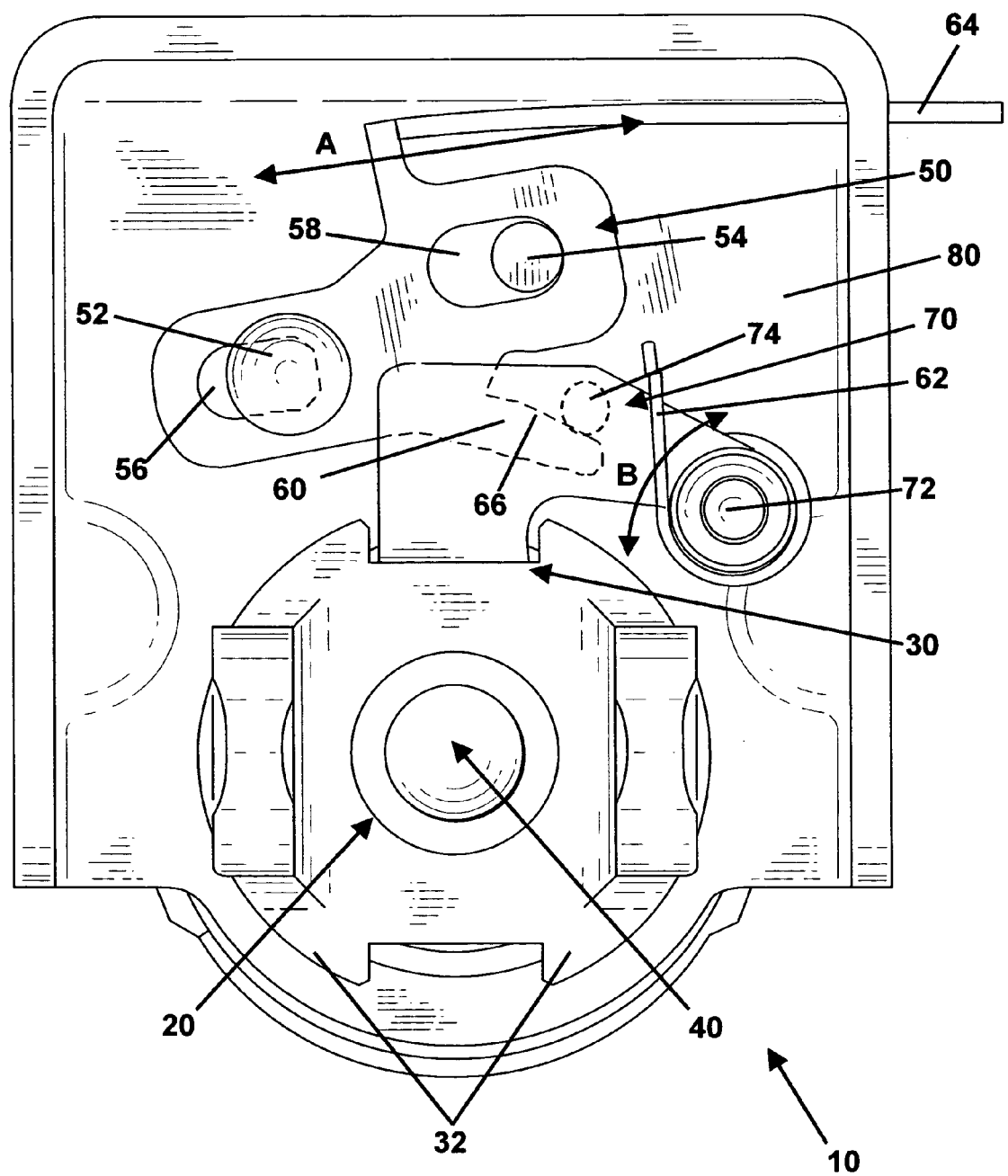

In one embodiment, as shown in FIGS. 3 and 4, the actuator 50 may be operably attached to the steering column 20 with a supporting mounting fixture 80. The actuator 50 may translate with respect to the mounting fixture 80 in a sliding manner, in the general direction denoted by double arrow A. Actuator 50 may include at least one and, in this case two, actuator pins 52, 54 positioned with at least one and, in this case two, apertures 56, 58 formed in the actuator 50. Actuator pins 52, 54 may be secured to the mounting fixture 80 and may retain the actuator 50 to the mounting fixture 80. Movement of the actuator 50 provides for the sliding translation with respect to the steering column 20. Those skilled in the art will appreciate that numerous strategies may be implemented for providing translation of the actuator 50 as well as operably attaching the actuator 50 to the steering column 20.

In one embodiment, the lever arm 70 may be operable attached to the mounting fixture 80 with a bolt 72, or other attachment means. Bolt 72 allows rotation of the lever arm 70 about an axis as shown by arrow B. Lever arm 70 may include a lever pin 74 (shown in phantom) for engaging an actuator lip portion 60 (shown in phantom) as the actuator 50 slidably translates. A torsion spring 62 may be operably attached to the lever arm 70 for biasing the lever arm 70 towards engagement with the gear portion 30. Gear portion 30 may comprise a plurality of teeth 32 and, in this case four, uniformly spaced (i.e., centered at about 90 degrees one from another). In this case, the engagement of the lever arm 70 with the gear portion 30 requires at most 90 degrees of rotation of the shaft 40. In another embodiment, the number of teeth may vary from four thereby changing the amount of rotation of the shaft 40 required for engagement of the lever arm 70 with the gear portion 30. For example, a gear portion including three teeth would require at most 120 degrees of shaft 40 rotation. In addition, the strategy for attaching the actuator 50 to the mounting fixture 80 and providing the sliding translation may vary as from the described and illustrated embodiments as desired.

In one embodiment, the actuator 50 may include a cable 64 operably attached to an ignition assembly 62 for sliding the actuator 50. When an appropriate key is inserted into the ignition assembly 62 and turned, the cable 64 may slide the actuator 50, thereby translating the actuator 50 relative to the mounting fixture 80 as depicted in FIG. 3 (i.e., the actuator 50 translates to the right). As the actuator 50 translates to the right, the actuator lip portion 60 engages the lever pin 74. As a result, the lever arm 70 rotates upward about bolt 72 and disengages the gear portion 30. Actuator lip portion 60 may include an angled slope 66 thereby providing gradual disengagement of the lever arm 50 from the gear portion 30. Steering assembly 10 is shown in an unlocked position in FIG. 3 whereby the shaft 40 is free to rotate. The unlocked mode typically is provided for free operation and steering of a vehicle.

When the key is removed from the ignition assembly 62, the cable 64 may slide the actuator 50, thereby translating the actuator 50 relative to the mounting fixture 80 as depicted in FIG. 4 (i.e., the actuator 50 translates in the left). As the actuator 50 translates to the left, the lever pin 74 slides down the angled slope 66. As a result, the torsion spring 62 urges the lever arm 70 downward and into engagement with the gear portion 30. Steering assembly 10 is shown in a locked position in FIG. 4 whereby the shaft 40 is locked, preventing rotation. If the lever arm 70 contacts a tooth 32 during its engagement with gear portion 30, a small degree of rotation of the shaft 35 is required to allow the lever arm 70 to fully engage the gear portion 30 (i.e., to "snap" into position between the teeth 32). Once the lever arm 70 fully engages the gear portion 30, the shaft 35 is then fully locked as shown in FIG. 4. The locked mode typically is provided to prevent unauthorized use and theft of the vehicle.

In another embodiment, the ignition assembly 62 is replaced by a motor (not shown). The actuator 50 may be coupled to the motor via the cable 64 to provide the slidable translation of the actuator 50. As such, engagement of the lever arm 70 with the gear portion 30 is automated and is not coupled to the manual insertion, turning, and removal of the key. An actuating signal to the motor energizes the motor to drive the cable 64 and cause the actuator 50 to move.

Figure 5:
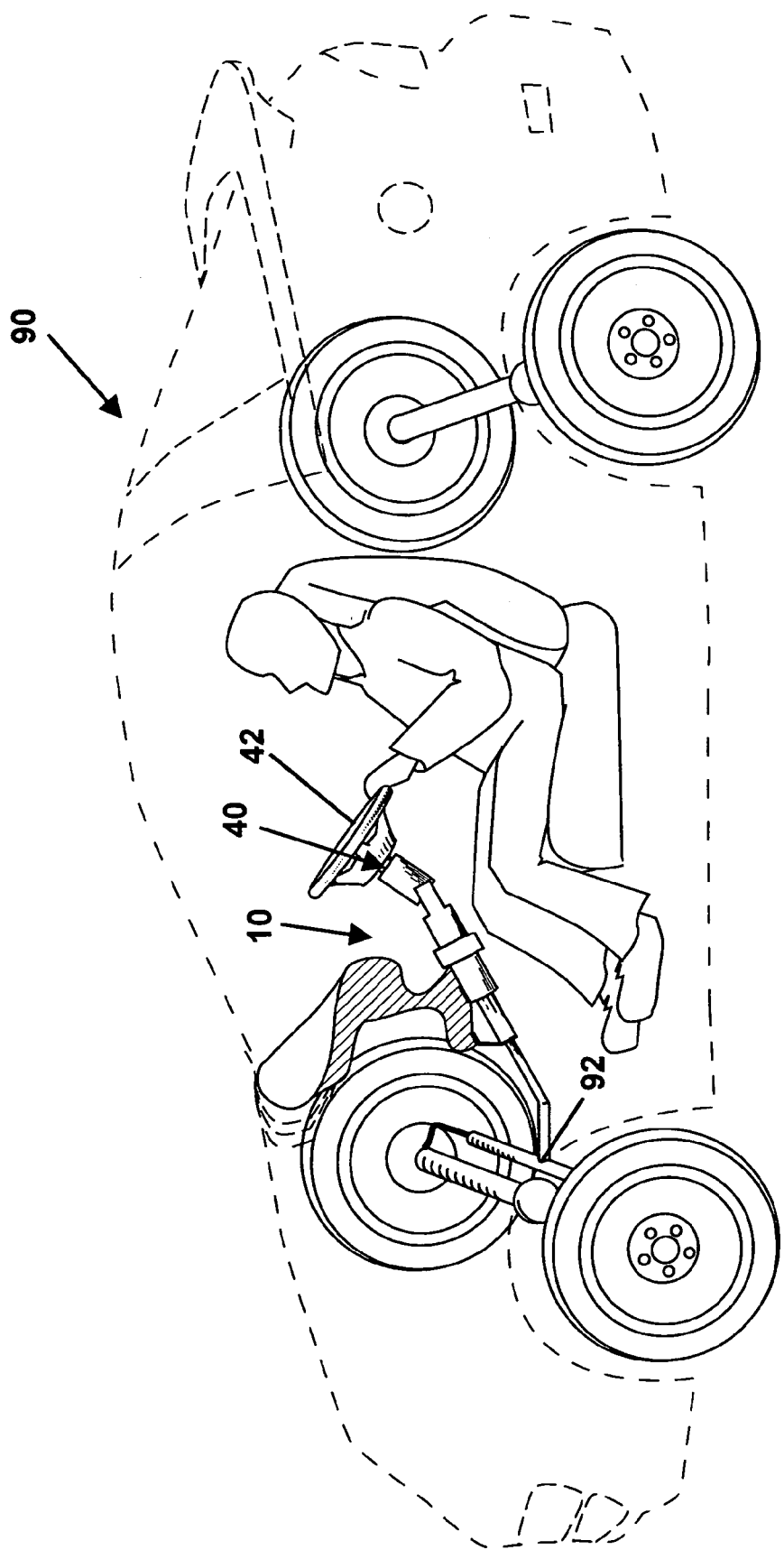
FIG. 5 is a schematic view of the steering assembly shown in FIG. 1 operably attached to a vehicle.

As shown in FIG. 5, the assembly 10 may be operably attached to a vehicle 90. Assembly 10 may be adapted for use in various types of vehicles. Preferred embodiments, by way of example, are shown and described herein as an automobile vehicle employing the invention. While the preferred embodiments include a steering column lock assembly, it will be appreciated by those skilled in the art that the invention is not limited to automobiles alone but may be applied to other vehicles such as a minivan, truck, airplane, marine vessel, and the like. Shaft 40 may be operably attached at a first end to a steering wheel 42 for rotation by a user of the vehicle 90. Shaft 40 may be operably attached at a second end to a rack-and-pinion assembly 92 or other steering-type assembly and wheels. As such, rotation of the steering wheel 42 results in a corresponding turning of wheels thereby providing steering of the vehicle 90.

While the embodiments of the invention disclosed herein are presently considered to be preferred, various changes and modifications can be made without departing from the spirit and scope of the invention. For example, the steering assembly configuration, and method of operating the same are not limited to any particular design or sequence. Specifically, the steering column, steering component, and method of operation may vary without limiting the utility of the invention.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

The invention claimed is:

1. A steering column lock assembly comprising:
a steering column having a gear portion and a rotatable shaft;
an actuator operably attached to the steering column, the actuator being free to translate wit respect to the steering column;
a lever arm operably attached to the steering column;

wherein translation of the actuator engages the lever arm with the gear portion to lock the steering column; and a cable operably attached to at least one of an ignition assembly or a motor, to slide the actuator.

2. The assembly of claim 1 wherein the gear portion comprises a plurality of uniformly spaced teeth.

3. The assembly of claim 1 wherein the gear portion comprises four uniformly spaced teeth.

4. The assembly of claim 1 wherein the actuator comprises:
an aperture formed in the actuator; and
an actuator pin disposed in the aperture to provide sliding translation of the actuator with respect to the steering column.

5. The assembly of claim 1 wherein the actuator has an actuator lip portion, the lever arm has a lever pin, and the actuator lip portion engages the lever pin.

6. The assembly of claim 1 wherein the lever arm comprises a torsion spring biasing the lever arm toward the gear portion.

7. The assembly of claim 1 wherein the steering column is operably attached to a vehicle.

8. The assembly of claim 1 further comprising a mounting fixture operably attached to the steering column to support the actuator and the lever arm.

9. A method of operating a steering column lock assembly, the method comprising:
providing a steering column including a gear portion and a rotatable shaft;
providing an actuator and a lever arm operably attached to the steering column;
translating the actuator with respect to the steering column;
engaging the gear portion with the lever arm as a result of the translating;
locking the steering column as a result of the engaging;
biasing the lever arm toward the gear portion.

10. The method of claim 9 wherein the translating the actuator comprises translating the actuator with an ignition assembly.

11. The method of claim 9 wherein the translating the actuator comprises translating the actuator with a motor.

12. The method of claim 9 wherein the translating the actuator comprises a sliding the actuator.

13. The method of claim 9 wherein the engaging the gear portion wit the lever arm comprises rotating the lever arm.

14. The method of claim 9 further comprising supporting the actuator and the lever arm on the steering column.

15. A steering column lack assembly comprising:
a steering column including a gear portion and a rotatable shaft;
an actuator and a lever arm operably attached to the steering column;
means for supporting the actuator and the lever arm to the steering column;
means for translating the actuator with respect to the steering column;
means for engaging the gear portion with the lever arm as a result of a rotation of the shaft and the translation of the actuator;
means for locking the steering column as a result of the engagement of the gear portion with the lever arm; and
means for biasing the lever arm toward the gear portion.

16. The assembly of claim 15 wherein the translating means is selected from the group consisting of an ignition assembly and a motor.

* * * * *